United States Patent
Negishi et al.

[11] Patent Number: 6,064,777
[45] Date of Patent: May 16, 2000

[54] IMAGE PROCESSING APPARATUS AND METHOD WHICH COMPOSES AN IMAGE ON THE BASIS OF A RASTER IMAGE SIGNAL AND AN IMAGE SIGNAL CONVERTED BY AN OPTICAL-ELECTRIC CONVERSION DEVICE

[75] Inventors: Akira Negishi, Fujisawa; Osamu Abiko, Tokyo, both of Japan

[73] Assignee: Canon Kabushiki Kaisha, Tokyo, Japan

[21] Appl. No.: 08/854,752

[22] Filed: May 12, 1997

Related U.S. Application Data

[63] Continuation of application No. 08/151,989, Nov. 15, 1993.

[30] Foreign Application Priority Data

Nov. 16, 1992 [JP] Japan .................................. 4-305434

[51] Int. Cl.⁷ .................................................. G06F 15/62
[52] U.S. Cl. .......................................... 382/284; 382/282
[58] Field of Search ................................. 358/448, 450, 358/538, 540, 452–453, 524; 382/282, 284; 395/134–135

[56] References Cited

U.S. PATENT DOCUMENTS

| | | | |
|---|---|---|---|
| 4,896,208 | 1/1990 | Moriya et al. | 358/78 |
| 4,949,188 | 8/1990 | Sato | 358/448 |
| 5,028,993 | 7/1991 | Kobori et al. | 358/78 |
| 5,034,806 | 7/1991 | Ikeda et al. | 358/450 |
| 5,051,843 | 9/1991 | Hayashi | 358/450 |
| 5,325,449 | 6/1994 | Burt et al. | 382/284 |
| 5,377,330 | 12/1994 | Kubota et al. | 382/284 |
| 5,481,375 | 1/1996 | Eto et al. | 358/450 |

FOREIGN PATENT DOCUMENTS 518619   12/1992   European Pat. Off. .

*Primary Examiner*—Thomas D. Lee
*Assistant Examiner*—Stephen Brinich
*Attorney, Agent, or Firm*—Fitzpatrick, Cella, Harper & Scinto

[57] ABSTRACT

An image forming apparatus has a developing device which develops a portion of one page into raster image data by translating a page describing language. A memory stores the developed partial image data of one page, and a reader reads an original in the units into which the original is divided. A composition device forms composite image data on the basis of the image data read from the memory and the original image data read from the memory and the original image data read by the reader. A control circuit controls the development device, the reader and an image forming device so as to develop an image of one page in the predetermined units. In addition the control circuit operates the reader, the composition device and the image forming device so as to form an image in synchronism with development of an image in the units, and repeats image development in the units to form an image for one page.

17 Claims, 17 Drawing Sheets

AFTER BLACK CHARACTER PROCESSING

FIG. 5

| BIT | CONTENT | CONTROL SIGNAL |
|---|---|---|
| 7 | 0 : PRINTING<br>1 : NO PRINTING | MIX DATA |
| 6 | HOLDING | |
| 5 | HOLDING | |
| 4 | 0 : DATA REVERSAL<br>1 : NO DATA REVERSAL | NEGA |
| 3 | 0 : EDGE ENHANCEMENT<br>1 : SMOOTHING | PHOTO |
| 2 | HOLDING | |
| 1 | HOLDING | |
| 0 | 0 : NO BLACK CHARACTER PROCESSING<br>1 : BLACK CHARACTER PROCESSING | KB |

FIG. 10

| KE0 | KE1 | KEBASE | (RL≦VDD3≦RH) & (GL≦VDD2≦GH) & (BL≦VDD3≦BH) | OUTPUT DECISION SIGNAL |
|---|---|---|---|---|
| H | × | × | × | L |
| L | H | × | × | H |
| L | L | L | No | L |
| L | L | L | Yes | H |
| L | L | H | No | H |
| L | L | H | Yes | L |

(SCANNER IMAGE)  (PDL DEVELOPED IMAGE)  (WHITE COMPOSITION IMAGE)

(SCANNER IMAGE)  (PDL DEVELOPED IMAGE)  (BLACK COMPOSITION IMAGE)

FIG. 14

| | RL RH GL GH BL BH | KE0 | KE1 | KEBASE |
|---|---|---|---|---|
| NO COMPOSITION MODE | × | 1 | 0 | × |
| WHITE COMPOSITION MODE | FF$_H$ | 0 | 0 | 0 |
| BLACK COMPOSITION MODE | 00$_H$ | 0 | 0 | 0 |

IMAGE PROCESSING APPARATUS AND METHOD WHICH COMPOSES AN IMAGE ON THE BASIS OF A RASTER IMAGE SIGNAL AND AN IMAGE SIGNAL CONVERTED BY AN OPTICAL-ELECTRIC CONVERSION DEVICE

This application is a continuation of application Ser. No. 08/151,989 filed Nov. 15, 1993.

BACKGROUND OF THE INVENTION

1. Field of the Invention

The present invention relates to an image processing apparatus, and particularly to an image processing system which prints, on paper or the like, image data stored in an image memory. The stored image data is such as an image obtained by developing a page describing language and image data obtained by scanning an original.

2. Description of the Related Art

A system is known comprising a color copying machine and a unit connected to the color copying machine so as to output a raster image by developing page describing language (referred to as "PDL" hereinafter) data and printing out the data on paper or the like. A system is also known for copying an image with a color copying machine by using a printing head having ink jet nozzles, which form a line, for repeatedly scanning the bands into which one page is divided and each of which has the same width as that of the printing head. Further, an apparatus is known for developing PDL data for each band width and outputting the data. This apparatus is provided in correspondence with a printer such that data of a page is divided into bands having the same width as that of the printing head and is printed out.

However, the above-described conventional systems have the following problems:

When a PDL developing device is connected to a color copying machine in which an image is divided into the above band units and copied so as to compose an image on the basis of an original image of the color copying machine and a PDL developed image, a memory unit or the like must be connected to the color copying machine so that the original image is read by a host computer through the memory unit, and an image is composed by the PDL image using image editing software of the host computer and is printed out through the memory unit or the PDL developing device. In this method, since there are large amounts of image data describing the original image, particularly a color image, much time is required for transferring the data from the color copying machine to the host computer through the memory unit. This method thus has the problem that since the large amount of data describing the original image must be processed by the host computer, the host computer is required to have a large-capacity memory, and the CPU is also required to have a high processing speed. In addition, a long time is required for transferring the PDL image and the original image to the color copying machine because the amount of data is significantly increased, as compared with transfer of PDL data alone. There is also the problem that much time is required for outputting the composite image.

SUMMARY OF THE INVENTION

An image processor has a development device which develops a portion of a page into raster image data by translating a page describing language. A storage device stores partial image data of the page developed by the development device, and an original reader reads an original image in the predetermined units into which the original image is divided. A setting device sets the processing contents for composing an image, and a composition device forms composite image data in pixel units by the composition processing set by the setting device on the basis of the image data read from the storage device and the original image data read by the original reader. A controller controls the development device, the original reader and the image forming unit so as to divide a page into predetermined units. In addition, the controller develops an image in the units, actuates the original reader and the composition device to form an image in the units after the image is completely developed in the units, and repeats the image development in the units to form an image of one page.

BRIEF DESCRIPTION OF TFE DRAWINGS

Figure 4A:
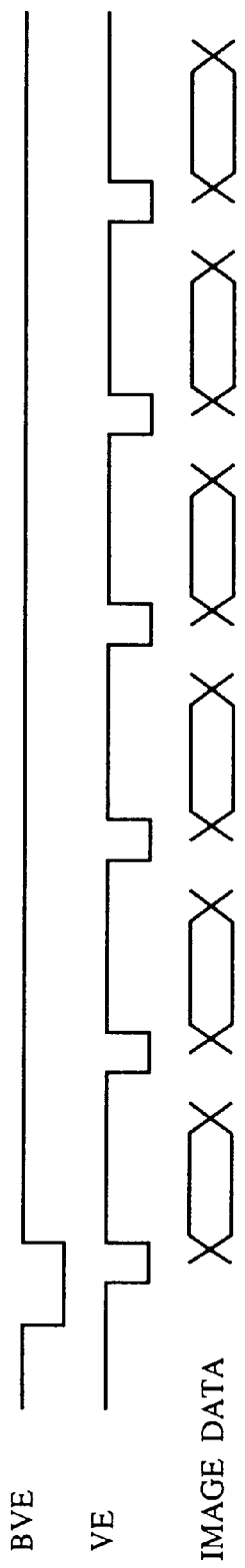
Figure 4B:
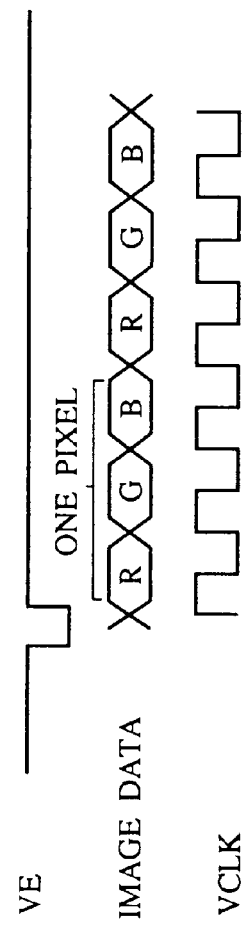
Figure 4C:
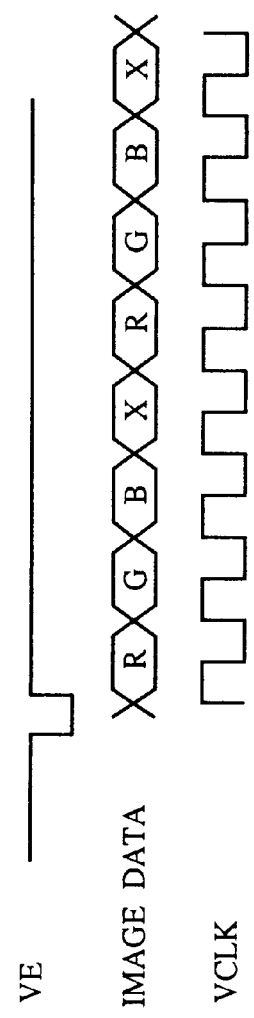
Figure 6:
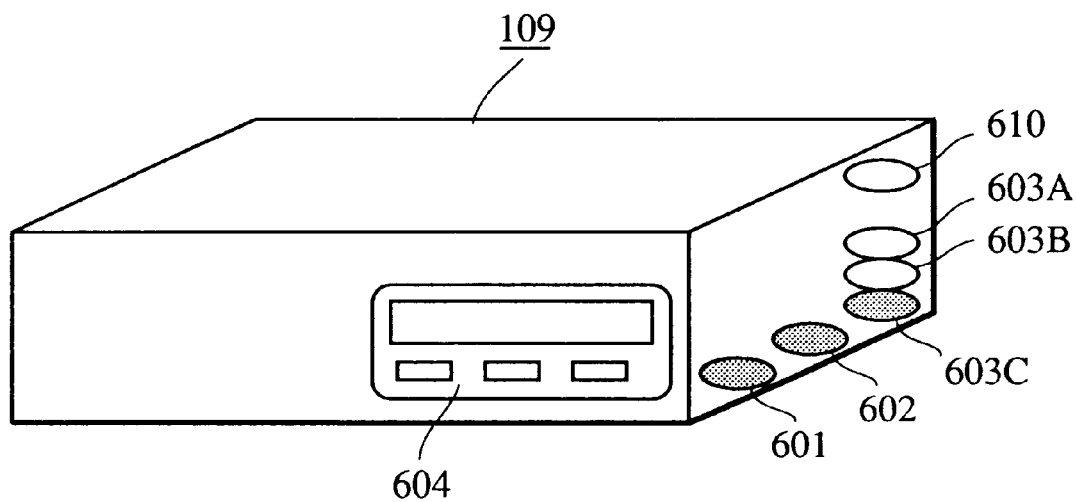
Figure 7:
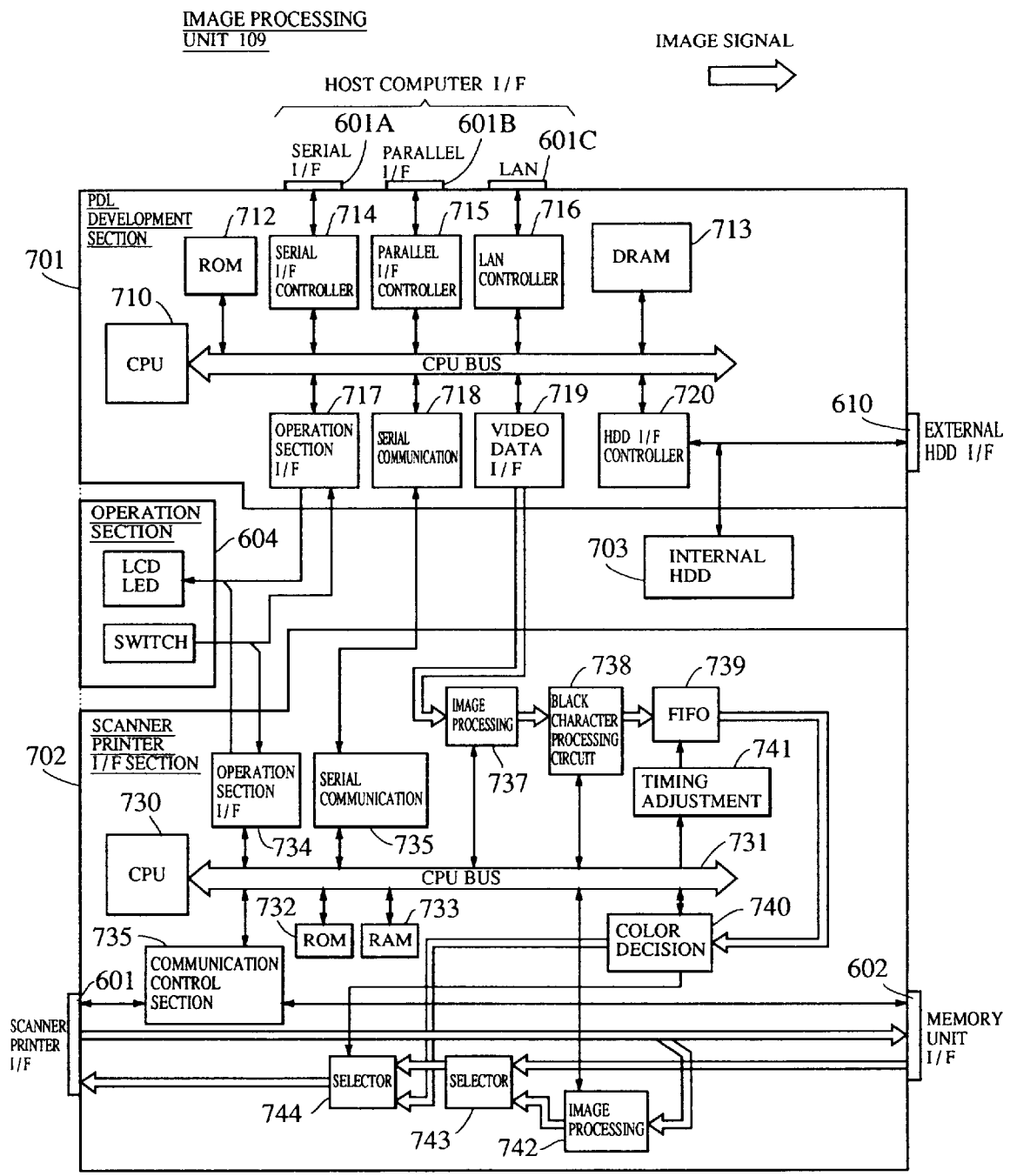
Figure 8:
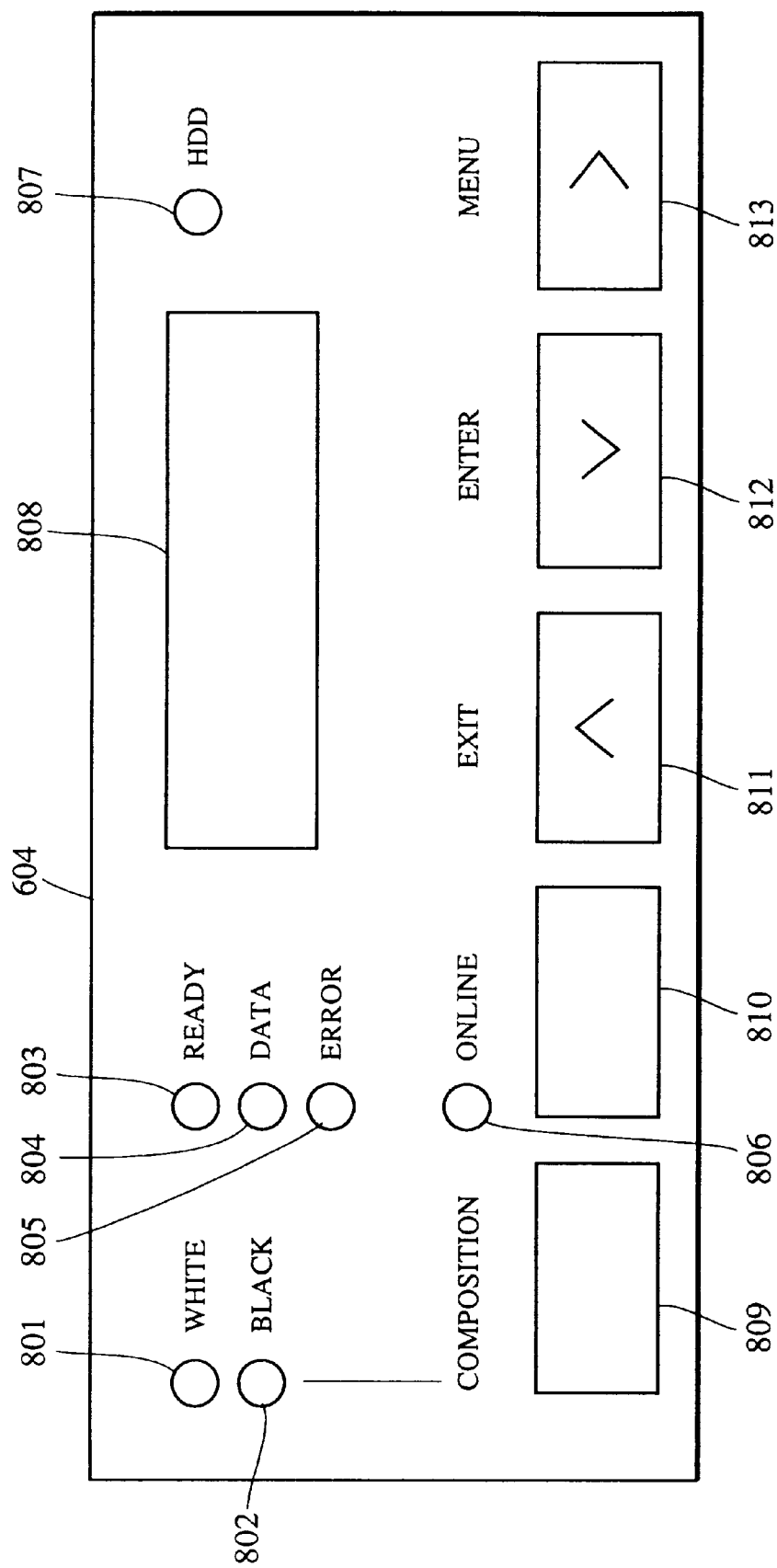
Figure 11:
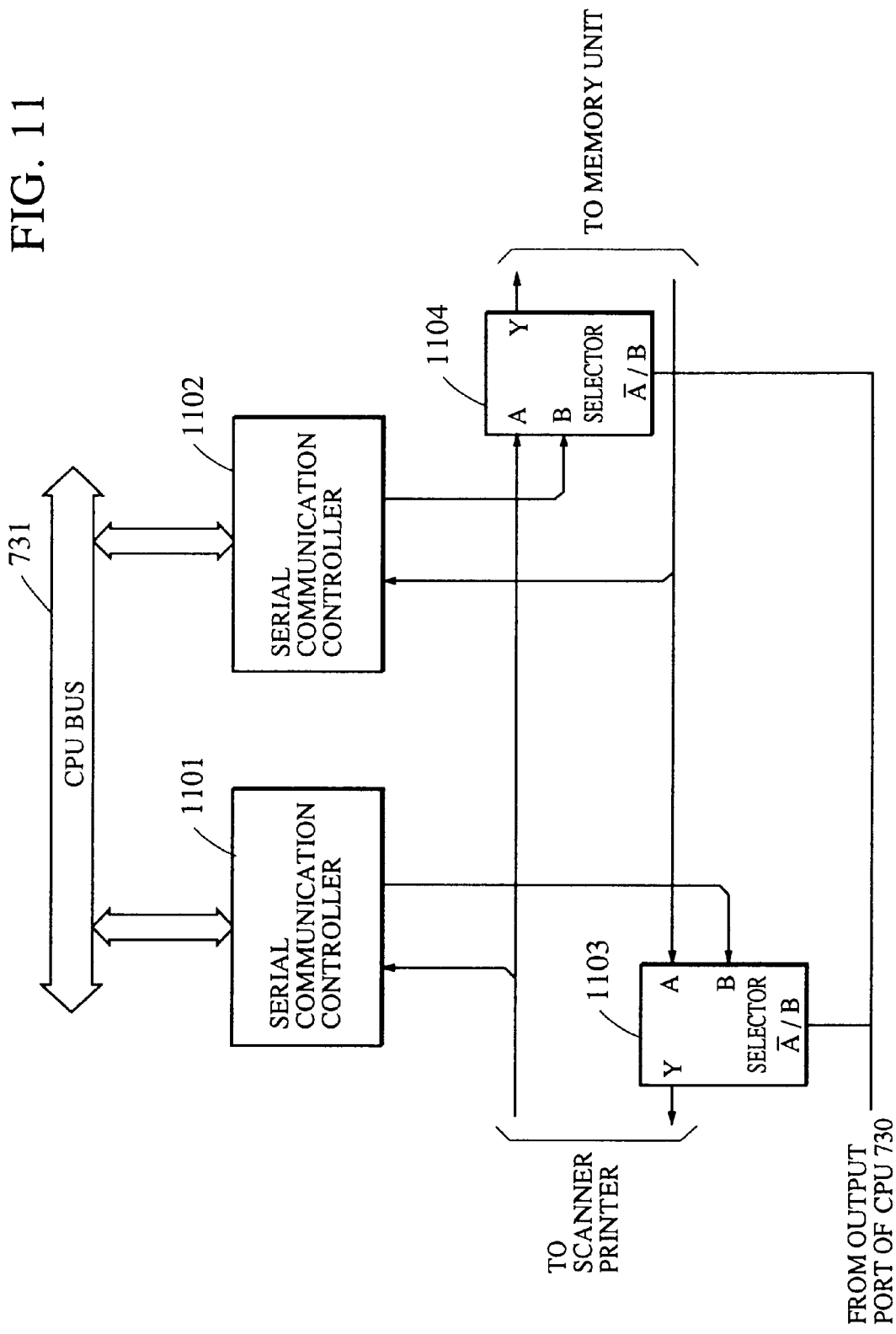
Figure 12:
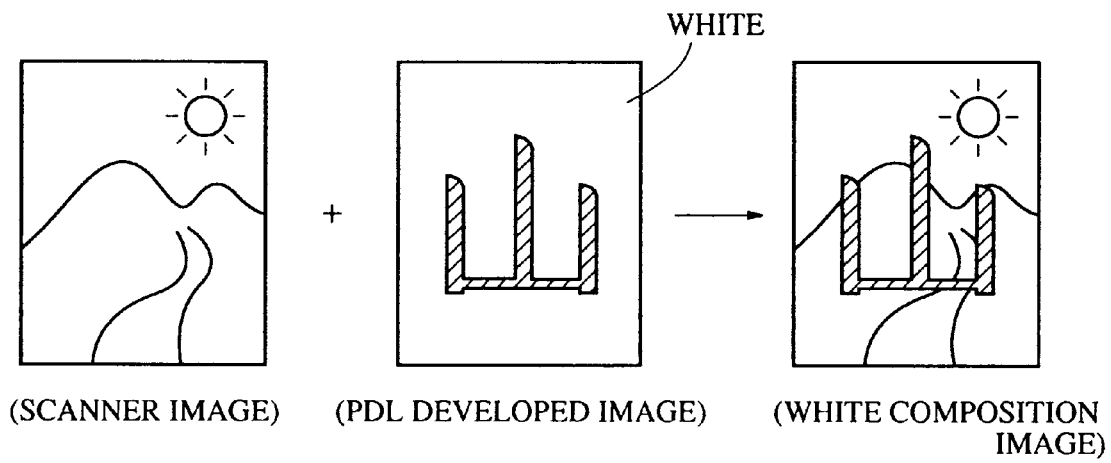
Figure 12:
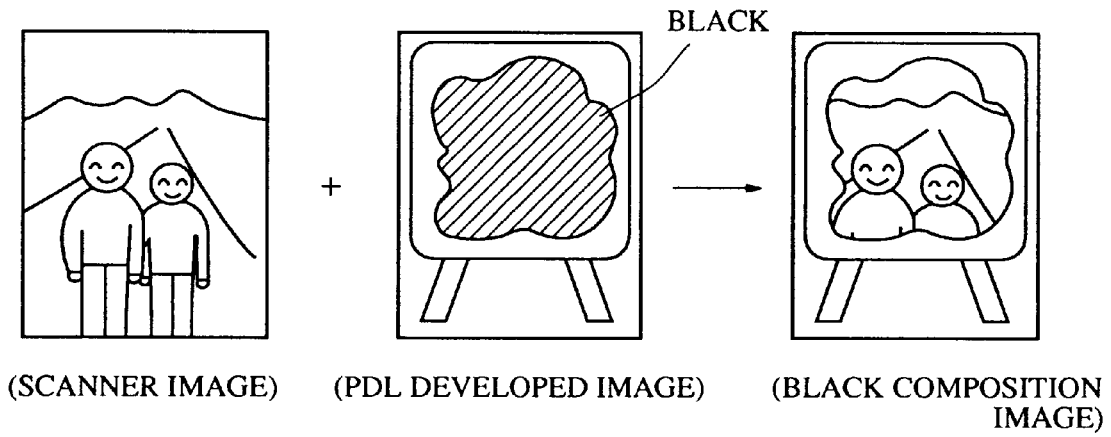
Figure 13:
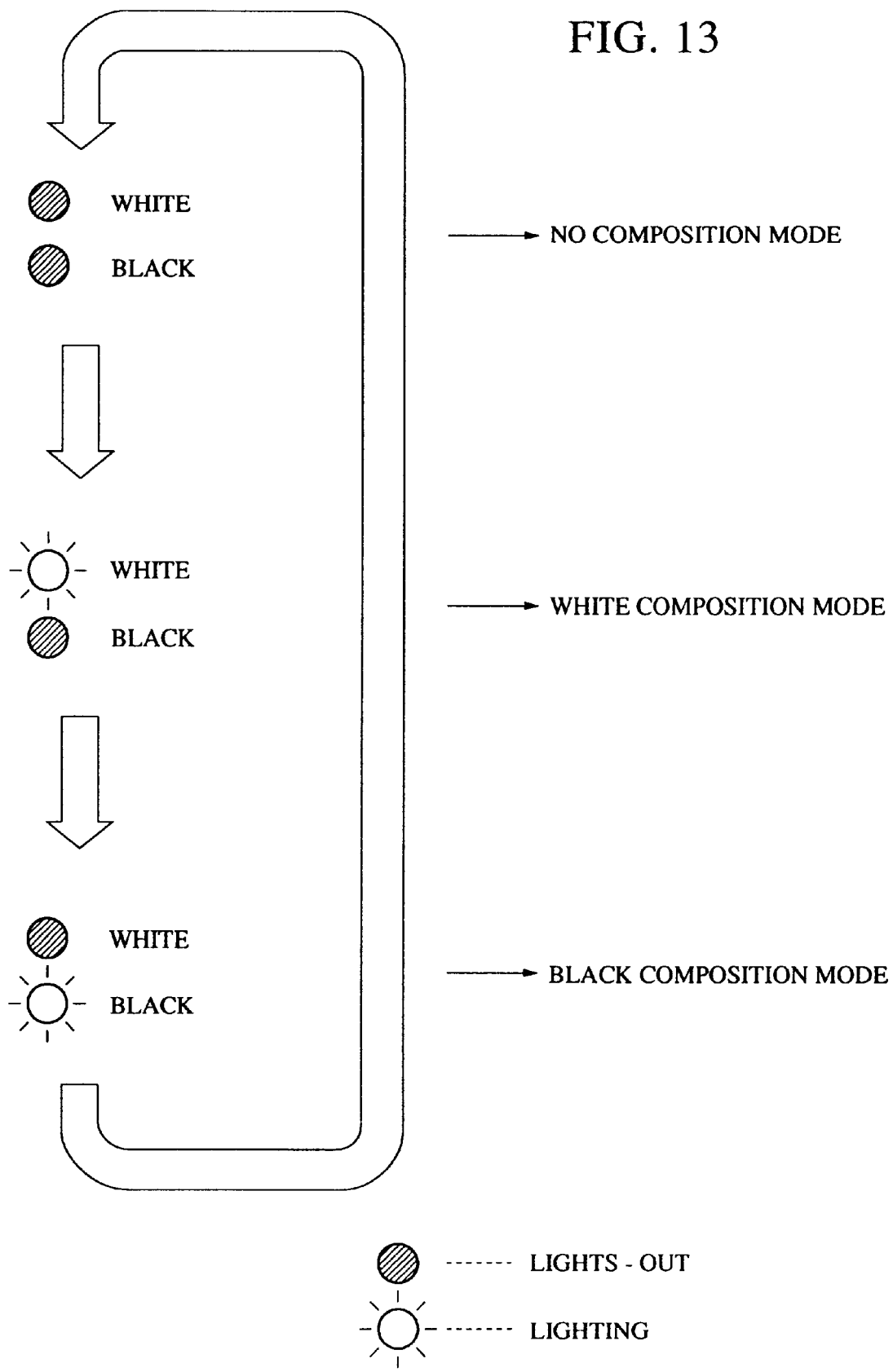
Figure 15:
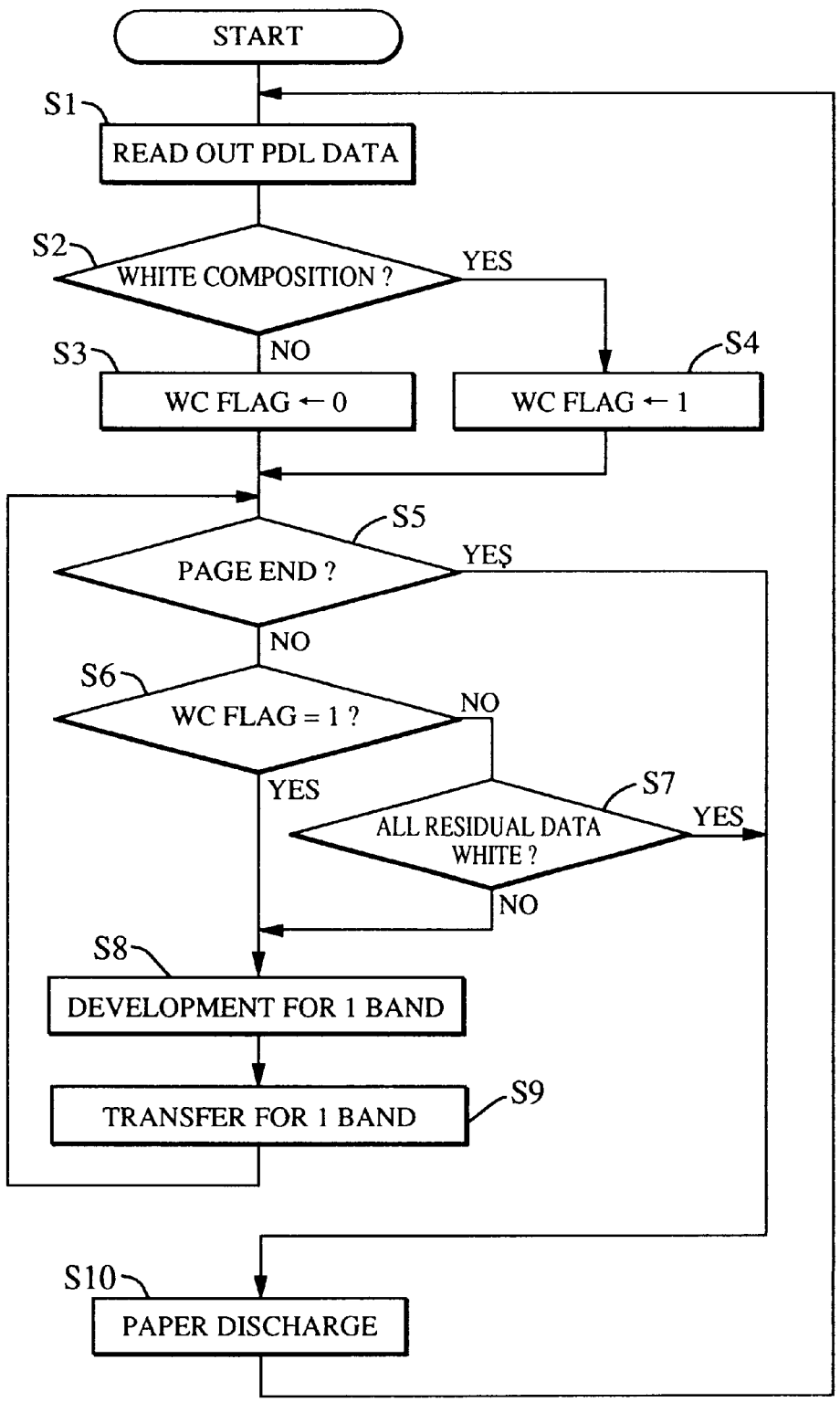

FIGS. 4(a), 4(b) and 4(c) are charts showing the operation timing of the scanner printer of the embodiment;

FIG. 5 is a table showing an example of the contents of data X to be added by a black character processing circuit a of the embodiment;

FIG. 6 is a perspective view showing the appearance of an image processing unit of the embodiment;

FIG. 7 is a block diagram showing an example of the configuration of the image processing unit of the embodiment;

FIG. 8 is a drawing showing an example of an operation section of the image processing unit of the embodiment;

FIGS. 9(A), 9(B), 9(C) and 9(D) are drawings showing an example of the configuration of a color decision section of the image processing unit of the embodiment and the timing chart therefor;

FIG. 10 is a table showing the values set, in each of operation modes, in registers of the color decision section of the image processing unit of the embodiment;

FIG. 11 is a drawing showing an example of the configuration of a communication control section of the image processing unit of the embodiment;

FIGS. 12(1) and 12(2) are drawings showing examples of output of image composition in the embodiment;

FIG. 13 is a drawing showing an example of display of the composition modes in the operation section of the embodiment;

FIG. 14 is a table explaining setting, in each composition mode, of the registers of a color conversion section of the embodiment; and FIG. 15 is a flowchart showing the processing of CPU of a PDL development section of the embodiment.

DESCRIPTION OF THE PREFERRED EMBODIMENTS

An image processing system in accordance with an embodiment of the present invention is described in detail below with reference to the drawings.

First Embodiment

Figure 1:
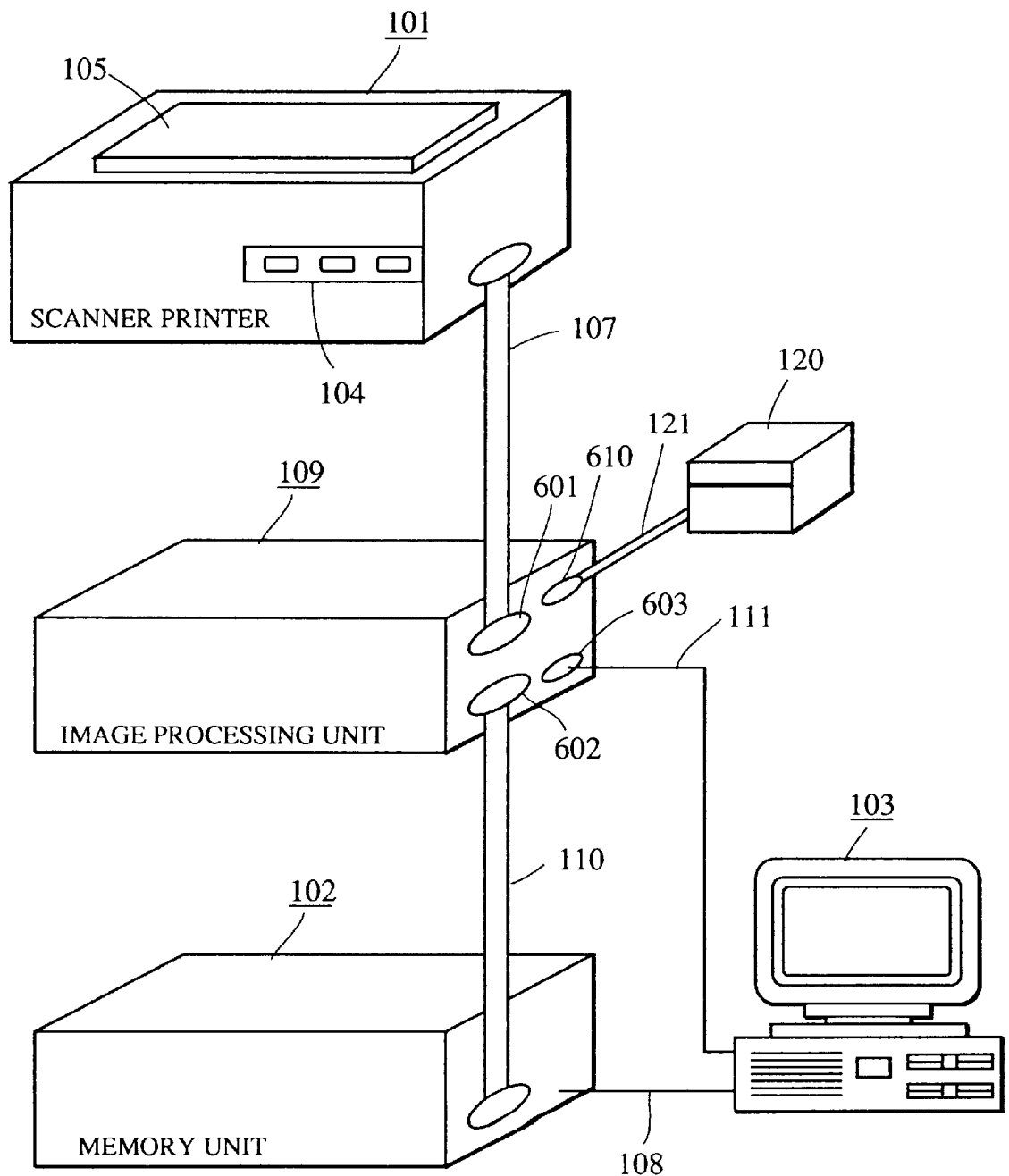
FIG. 1 is a block diagram showing an example of the configuration of an image forming system in accordance with an embodiment of the present invention.

FIG. 1 is a block diagram showing an example of the configuration of an image processing system in accordance with an embodiment of the present invention.

In FIG. 1, reference numeral 101 denotes a scanner printer, for example, including a color image scanner and an ink jet printer etc. This embodiment uses an ink jet printer which employs thermal energy for discharging ink droplets.

Reference numeral 109 denotes an image processing unit as a nuclear section of the image processing system of the present invention.

Reference numeral 102 denotes a memory unit; reference numeral 103, a host computer; and reference numeral 120, a HDD (Hard Disk Drive).

The scanner printer 101, the image processing unit 109 and the memory unit 102 are connected in cascade by cables 107 and 110.

When a copy start key 104 of the scanner printer 101 is turned on, a color original image placed below a platen 105 is singly copied, and substantially at the same time, the read digital data of the image is transmitted to the image processing unit 109 and the memory unit 102 through the cables 107 and 110.

The image processing unit 109 develops, into a raster image, the PDL data sent from the host computer 103 through a cable 111 of a general-purpose interface such as Centronics or RS232C, and sends the raster image to the scanner printer 101 and outputs the image therefrom. The image processing unit 109 also performs some image processing of the raster image formed by developing the PDL data and the image data sent from the scanner printer 101, and then returns the processed image data to the scanner printer 101 to output the image.

The memory unit 102 sends the image data received from the scanner printer 101 to the host computer 103 through a general-purpose interface 108 such as SCSI or GP-IB to enable various kinds of image edit processing. The memory unit 102 also sends, to the scanner printer 101, the image data sent from the host computer through the general-purpose interface 108, and outputs the data from the scanner printer 101.

Figure 2:
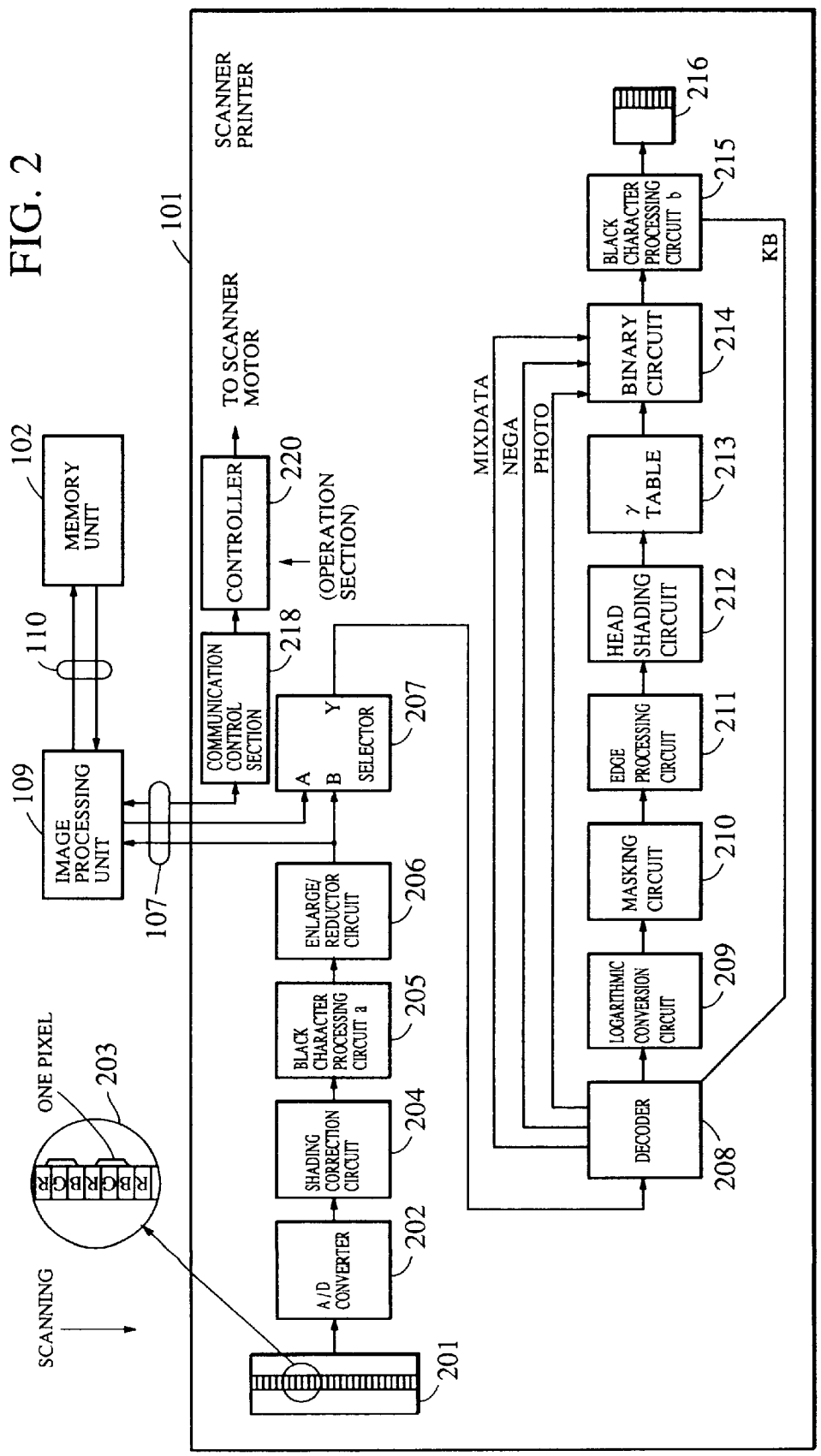
FIG. 2 is a block diagram showing an example of the configuration of a scanner printer of the embodiment.
Figure 3:
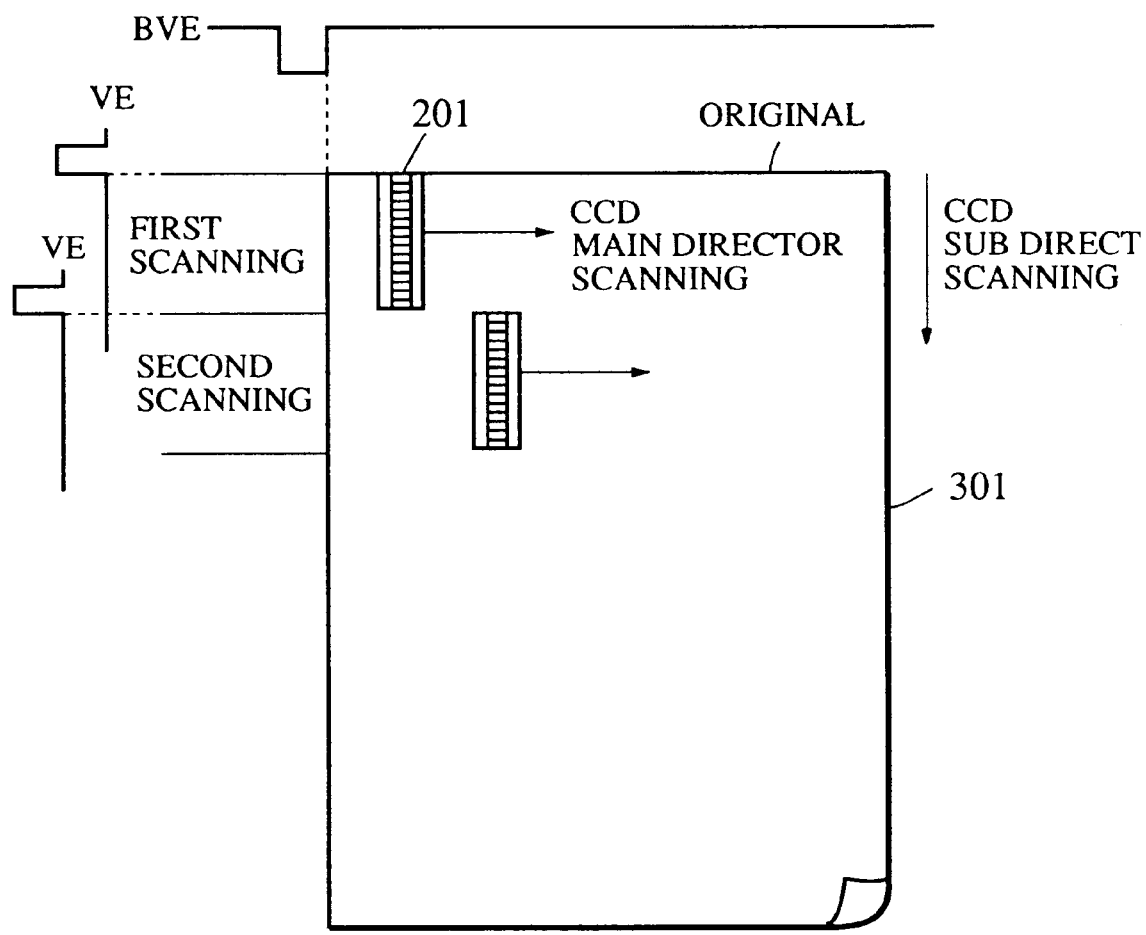
FIG. 3 is a drawing showing an example of the state wherein a line sensor of this embodiment scans an original.

FIG. 2 is a block diagram showing an example of the configuration of the scanner printer 101, FIG. 3 is a drawing showing an example of the state wherein a line sensor 201 scans an original image, FIG. 4 is a chart showing an example of the operation timing of the scanner printer 101 and FIG. 5 is a table showing an example of the contents of the data X added by a black character processing circuit a 205.

In FIG. 2, reference numeral 201 denotes a line sensor, for example, comprising a CCD. In the line sensor 201, as shown by an example in an enlarged view 203, sensors for respective colors are arranged in the order of R, G, B, R, G, B, . . . in the scanning direction, and a set of R, G and B sensors corresponds to one pixel.

The line sensor 201 successively performs horizontal main scanning and longitudinal subsidiary scanning for an original image 301, as shown by an example in FIG. 3. Namely, the line sensor 201 starts scanning of the entire original image synchronously with, for example, the rising of the signal BVE shown in FIGS. 3 and 4(a), and then performs first scanning, second scanning, . . . in band units in the sub-scanning direction in synchronism with, for example, the rising of the signal VE shown in FIGS. 3 and 4(a). In the image signal of each of the colors, data for one pixel corresponds to, for example, three clocks in a video clock VCLK, as shown by an example in an enlarged view in FIG. 4(b) of a portion near the rising portion of the signal VE. The image signal is transmitted synchronously with the video clock VCLK. The line sensor 201 is driven, for example, by a pulse motor (not shown), and is controlled by a control section (not shown) so as to scan any desired region of the original image. The configuration of these units is generally known, and is not described below for the shake of simplifying the description.

In FIG. 2, reference numeral 202 denotes an A/D converter for converting the analog image signal output from the line sensor 201 into digital image data.

Reference numeral 204 denotes a shading correction circuit 204 for performing white correction and black correction of the image data output from the A/D converter 202 in accordance with the characteristics of the line sensor 201.

Reference numeral 205 denotes a black character processing circuit a for detecting a black character contained in the original image from the image data R, G and B output from the shading correction circuit 204, processing the detected black character so as to prevent color bleeding in a printed character and sharpen the edge, and adding the data X thereto. The black character processing circuit a 205 is designed so as to output color data for one pixel, for example, with four clocks of the video clock VCLK, as shown in FIG. 4(c), and outputs the image data synchronously with the video clock VCLK. In other words, the black character processing circuit a 205 adds the data X (8 bits) having the contents shown by an example in FIG. 5, for each pixel of the input image data. For example, the black character processing circuit a 205 sets bit 0 of the data X of a pixel for which black character processing is executed to "1", and bit 0 of the data X of a pixel for which black character processing is not executed to "0". Further, the data X indicate the image processing information as shown by an example in FIG. 5. Namely, the value of bit 3 of the data X is controlled so that the edge is enhanced by the processing circuit below for the image data of a region where a black character is detected, and the image data is smoothed for a region where no black character is detected. In addition, bit 4 of the data X is set to "1" when instructions for negative/positive inversion are given. Bit 7 of the data X is described below.

In FIG. 2, reference numeral 206 denotes an enlarge/reduction circuit for processing the image data output from the black character processing circuit a 205 to change the size of the image indicating the image data to a desired size (enlargement or reduction).

The image data output from the enlarge/reduction circuit 206 is transferred to the image processing unit 109 and the memory unit 102 through the cables 107 and 110, as described above, as well as being transferred to a switch unit 207 (shown as a selector in FIG. 2).

The switch unit 207 selectively outputs the image data output from the image processing unit 109 and the memory unit 102 and the image data output from the enlarge/reduction circuit 206. Namely, when the switch unit 207 is switched so that the image data output from the enlarge/reduction circuit 206 is selected, the read color image or the like is copied by operation of the scanner printer 101 only.

Reference numeral 208 denotes a decoder for decoding the data X contained in the image data output from the switch unit 207. That is, the decoder 208 outputs the control signals MIX DATA, NEGA, PHOTO and KB shown as examples in FIG. 5 to the binary circuit 214 and the black character processing circuit b 215, both of which are described below, in accordance with the data X contained in the image data.

Reference numeral 209 denotes a logarithmic conversion circuit for converting the RGB image data output through the decoder 268, for example, into CMY image data.

Reference numeral 210 denotes a masking circuit for masking (converting into MYK image data) the image data output from the logarithmic conversion circuit in accordance with ink characteristics. When the scanner printer 101 is singly operated, masking processing is performed by the masking circuit 210 in which a coefficient is set by a control section (not shown) in consideration of both input masking and output masking. When the image data output from an external unit such as the image processing unit 109 is processed, masking processing is performed by the masking circuit 210 in which a coefficient is set by the control section (not shown) in consideration of output masking.

Reference numeral 211 denotes an edge processing circuit for sharpening the edge of the image data output from the masking circuit 210.

The above-described PHOTO signal may be input to the edge processing circuit 211 so as to control edge enhancement in accordance with the PHOTO signal.

Reference numeral 212 denotes a head shading circuit for processing the image data output from the edge processing circuit 211 so as to correct variations in the discharge amounts and the discharge directions of the respective nozzles of the printing head 216 below.

Reference numeral 213 denotes a γ table for converting the image data output from the head shading circuit 212 into data with a desired printing density.

Reference numeral 214 denotes the binary circuit for converting the multivalued image data output from the γ table 213 into binary image data on the basis of the control signals MIXDATA, NEGA and PHOTO which are output from the decoder 208. That is, the output of the binary data is controlled so that printing is performed when the signal MIXDATA about bit 7 of the data X is "0", and printing is not made when bit 7 is "1". The output is also controlled so that edge enhancement is made when the signal PHOTO about bit 3 of the data X is "0", and smoothing is made when bit 3 is "1".

Reference numeral 215 denotes the black character processing circuit b for performing black character processing of the image data output from the binary circuit 214 on the basis of the control signal KB from the decoder 208, Namely, if the signal KB is "1", black character processing is performed so that, for example, YMC data is set to "0", and K data only is set to "1".

Reference numeral 216 denotes a printing head for printing the image data output from the black character processing circuit 215 on recording paper by ink jets of the four colors Y, M, C and Bk. The operation timing of the printing head 216 synchronizes with the above signals BVE and VE so that the image is printed in band units. Since the construction and principle of printing by the ink jet process are generally known, they are not described below. For example, when a driving signal is applied to a heater disposed on a sheet or a liquid passage which holds an ink so as to abruptly increase the temperature thereof to a temperature higher than the boiling point of the ink in accordance with printing information, bubbles showing one-to-one correspondence with the driving signal are formed on the thermal working surface of the printing head. The ink is discharged to the recording paper through a discharge opening due to the growth and shrinkage of the bubbles to print an image on the recording paper.

Reference numeral 218 denotes a communication control section for communicating various commands between the scanner printer 101 and an external unit such as the image processing unit 109, and reference numeral 220 denotes a controller for controlling the operation of the scanner and printer in accordance with the instructions provided by the communication control section 218 or a console panel (not shown). In this embodiment, during memory composition, an image is read by the scanner printer for each band, as shown in FIG. 3, each time the image data is developed for each band, as described below.

The image processing unit 109 is described below.

FIG. 6 is a drawing showing the appearance of the image processing unit 109.

In FIG. 6, reference numerals 601 and 602 denote connectors to which the cables 107 and 110 shown in FIG. 1 are respectively connected so that the image processing unit 109 is connected to the scanner printer 101 and the memory unit 102.

Reference numeral 603 denotes a connector to which the cable 111 shown in FIG. 1 is connected so that the image processing unit 109 is connected to the host computer 103.

In this embodiment, the connector 603 includes the following three types of connectors 603A, 603B and 603C:

serial I/F connector parallel I/F connector

LAN connector

Reference numeral 610 denotes a connector for an external HDD (Hard Disk Drive). Although the external HDD is not necessarily required, the HDD is used for increasing font data or the like.

Reference numeral 604 denotes an operation section comprising keys for setting the state of the image processing unit 109, and a display LCD panel or LED.

FIG. 7 is a block diagram showing an example of the configuration of the image processing unit 109.

The image processing unit 109 is roughly divided into four sections including a PDL development section 701, a scanner printer I/F section 702, an internal HDD section 703 and the operation section 604.

The internal HDD 703 stores kanji font data and the like therein, and is unnecessary when only a ROM 712 and DRAM 713 of the PDL development section are sufficient for a case where no kanji is output.

The operation section 604 comprises an output LCD 808 and LED 801 to 807, and input switches 809 to 813, as shown by an example of the configuration in FIG. 8.

The LCD 808 indicates a state of the operation such as PDL development or the like by a message comprising an alphanumeric string.

The composition LED 801 and 802 are lit in operation modes of white composition and black composition, respectively. The ready LED 803 is lit when the image processing unit 109 can receive the PDL data from the host computer. The data LED 804 is turned on and off when the image processing unit 109 performs data processing such as PDL development. The error LED 805 is turned on and off when the image processing unit 109 causes an error of some kind. The on-line LED 806 is lit when the image processing unit 109 is in the on-line state. The hard disk LED 807 is lit when the internal HDD 704 is accessed.

The display configuration is not limited to the above, and a CRT or liquid crystal display or sound display may be used so far as the user can recognize the display.

The composition switch 809 switches the composition modes. The on-line switch 810 switches the on-line and off-line states. The menu switch 813 switches the mode to the menu setting mode in the off-line state, and has the function to switch menu items in the menu setting mode. The enter switch 812 has the function to select one of the menu items in the menu setting mode. The exit switch 811 is used for returning to a menu hierarchy 1 stage lower in the menu setting mode.

In the operation section, the composition LED 801 and 802, and the composition switch 809 are controlled by the CPU 730 of the scanner printer I/F section 702 through the communication control section 735, the other LED 803 to 807, and switches 810 to 813 being controlled by the CPU 710 of the PDL development section 701.

The internal block of the PDL development section 701 is described below.

In FIG. 7, reference numeral 710 denotes a CPU for controlling the entire PDL development section 701 through the CPU bus 711 on the basis of the program stored in the ROM 712. The CPU 710 performs high-load processing such as PDL image development, and thus comprises a CPU such as a RISC or the like which exhibits a high processing speed. Reference numerals 714, 715 and 716 denote serial I/F, parallel I/F and LAN controller circuits, respectively, which receive PDL data from the host computer 103 through connectors 601A, 601B and 601C, respectively. The thus-received PDL data is stored in a region of a DRAM 713 through the CPU bus 711. The CPU 710 develops raster image data from the PDL data stored in the region of the DRAM 713 by using the font data and so on stored in the ROM 712, the internal HDD 703 and the external HDD 120, and stores the developed data in a specified region of the DRAM 713.

The image development is performed in units of raster images corresponding to a plurality of bands into which one page is divided. This is matched to the output characteristics of the above scanner printer 101. Namely, in this embodiment, although the scanner printer 101 cannot be stopped in the course of printing of one band, it can be stopped between the respective bands. If the image development is made in the band units, therefore, the raster image storage region of the DRAM 713 need not have a storage capacity for one page, and a minimum storage capacity for one band is sufficient.

When the band image development is completed, the CPU 710 sends the raster image data stored in the DRAM 713 to the scanner printer I/F section through the video data I/F 719. When the data is completely sent, the CPU 710 again reads the PDL data in the DRAM 713, develops the raster image data of the next band, stores the developed data in the DRAM 713, and sends the data to the scanner printer I/F 702. The above operation is repeated for all of the bands of one page to form a raster image for one page.

The CPU 710 also controls display and switch input of the operation section 604 through the operation section I/F 717, and communicates with the scanner printer I/F section by using the serial communication circuit 718.

The internal block of the scanner printer I/F section is described below. The image signal described below comprises image data with a 8-bit width which is transmitted in the order of RGB in time series in the same manner as that shown in FIG. 4(*c*), the synchronous clock VCLK, the line synchronous signal VE and the band synchronous signal BVE.

The CPU 730 controls the entire scanner printer I/F section 702 through the CPU bus 713 on the basis of the program stored in the ROM 732. The CPU 730 controls the operation of the scanner printer 101 and the memory unit 102 and sets each of image processing circuits, and thus need not have a high processing speed, apart from the CPU 710 of the PDL development section 701. The RAM 733 is used as a workspace. The CPU 730 also controls output of the operation section and processes the input from the switches.

The color tints of the raster image data for one band sent from the PDL development section are first adjusted by the image processing section 737. This adjustment is performed by 3×3 matrix calculation for each 8-bit image data for one pixel RGB and γ-conversion using a LUT (Look-Up Table) therefor.

The next black character processing section 738 is the same as the black character processing circuit a 205 (FIG. 2) in the scanner printer 101. Namely, the black character processing section 738 checks a target pixel of the image data RGB and pixels in the vicinity thereof, and when a black edge portion is detected, bit 0 of the data X shown in FIG. 5 is set to 0. In the black character processing circuit b 215 (FIG. 2) of the scanner printer 101, therefore, data of chromatic colors C, M and Y are set to "0", and the residual K data alone is set to "1". As a result, an ink of a single black color is discharged from the head 216, thereby forming a black character with a clear outline.

The output from the black character processing section 738 is stored in a FIFO memory 739 which is controlled by a timing adjustment circuit 741 for adjusting timing with the scanner printer 101.

The image signal output from the FIFO memory 739 is input to a color decision section 740 which is described in detail below. The color decision section 740 makes a decision for each pixel as to whether or not the image color is the same as that previously set, and then outputs the 1-bit decision signal.

The image signal output from the color decision section 740 is input to the scanner printer 101 through a selector 744. On the other hand, the image signal obtained by scanning the original placed on the original plate of the scanner printer 101 is subjected to masking operation (3×3 matrix calculation of RGB data) in the image processing section 742, and input to a selector 743. The selector 743 first selects one of the original image of the scanner printer 101 and the output image of the memory unit 102, and the selector 744 selects one of the image selected by the selector 743 and the output image of the color decision section 740. Although the selector 743 is controlled in pages by the CPU 730, the selector 744 is controlled in pixels by the decision signal output from the color decision section 740. When no PDL image is output, the selectors 744 and 743 are set by the CPU 730 so that the image output from the memory unit 102 is sent to the scanner printer 101.

The communication control section 735 controls communication between the three units (the scanner printer 101, the image processing unit 109, and the memory unit 102) which are connected in cascade, and has the internal configuration shown in FIG. 11. A serial communication controller for the scanner printer 101 and a serial communication controller 102 for the memory unit 102 are connected to the CPU bus 731. The communication signal of each of the serial communication controllers 1101 and 1102 includes the input signal and output signal, the output signal being connected to the scanner printer 101 or the memory unit 102 through the selector 1103 or 1104. Each of the selectors 1103 and 1104 is switched by the CPU 730. The communication signal from the scanner printer 101 is sent to the side of the memory unit 102 by switching the selector 1104 to the A input side.

The communication signal output from the scanner printer 101 includes a standby signal. Before the selectors 1103 and 1104 are switched to the B input side, the CPU 730 determines through the serial communication controller 1101 whether or not the standby signal from the scanner printer 101 is active. If the standby signal is active, the CPU 730 waits until the standby signal becomes inactive. This process brings the image processing unit into the standby state, for example, in the local copy state of the scanner printer 101, by outputting the standby signal. When the selectors 1103 and 1104 are switched to the B input side, the CPU 730 sends the standby signal to the memory unit 102 through the serial communication controller 1102 so as to bring the memory unit 102 into the standby state.

The above-described control by the communication control section 736 permits communication between the three units connected in cascade as shown in FIG. 1.

The handshaking in a series of operations of the PDL development section and the scanner printer I/F section is performed by communication between the CPU 710 and the CPU 730 using the serial communications 718 and 735 on the basis of a predetermined protocol.

Figure 9A:
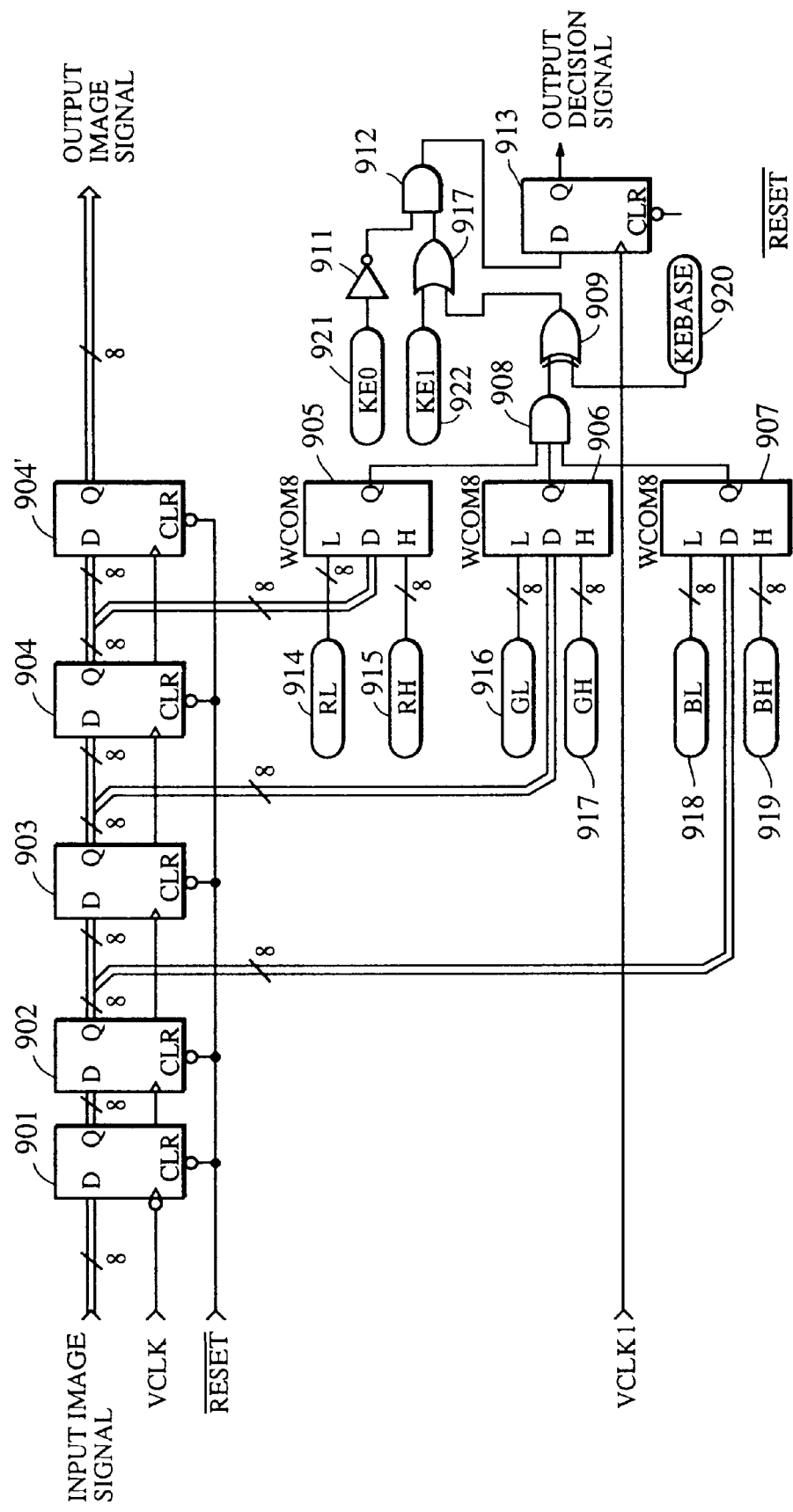
Figure 9B:
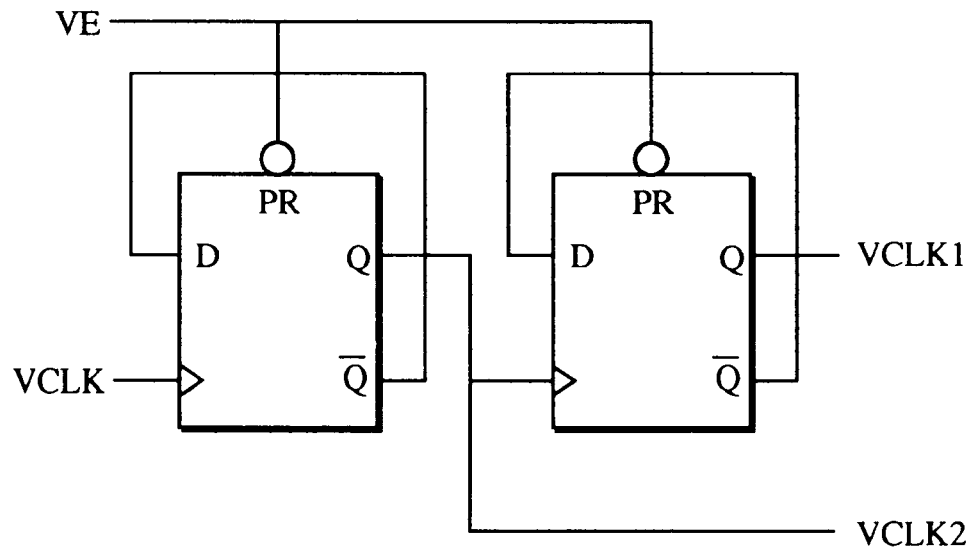
Figure 9C:
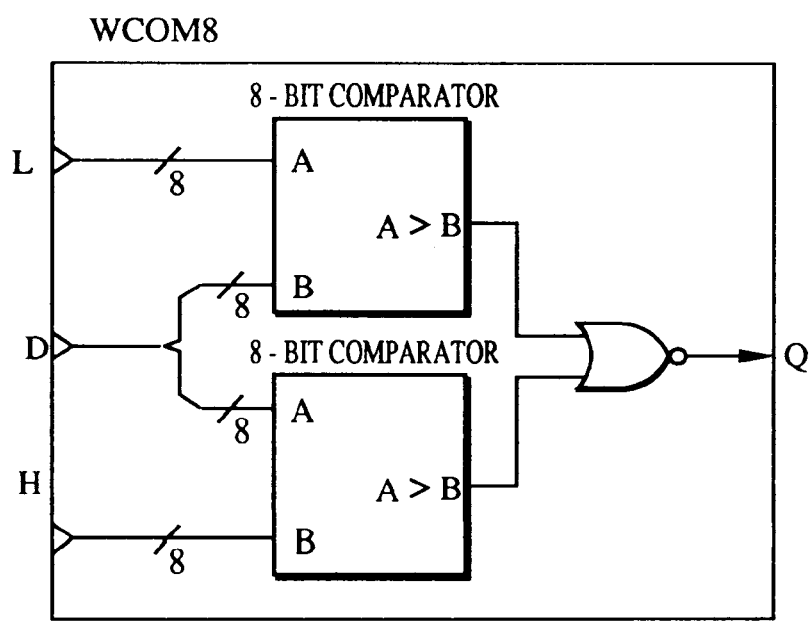
Figure 9D:
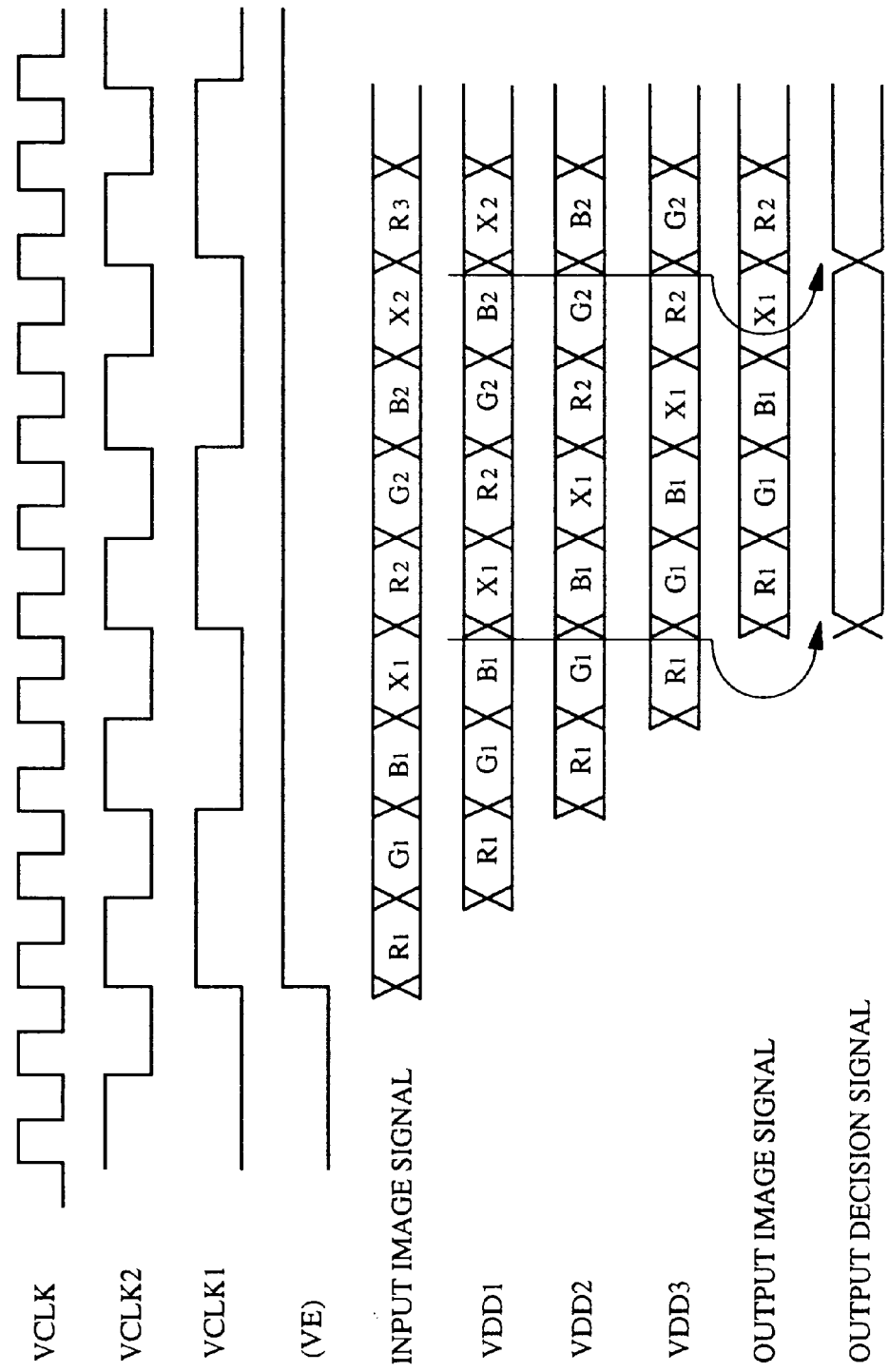

FIG. 9(A) shows an example of the configuration of a circuit of the color decision section 740. The input image signal is latched by flip flops 901 to 904 and 904' using the image clock signal VCLK, and is input to window comparators WCOM8 905 to 907 in the course of latching. Each of the window comparators WCOM8 comprises a circuit having three input terminals (L, D and H) with an 8-bit width, and 1-bit output which is made the High level only when $L \leq D$ and $D \leq H$. FIG. 9(C) shows the internal configuration of the window comparators WCOM8. The signals each shown by an ellipse in the drawing and respectively input to the input terminal L and H of each of the window comparators WCOM8 905 to 907 are the signals output from registers and are output signals of a latch (not shown) mapped in the memory space of the CPU 730. The CPU 730 can set the register values by writing values in the memory space. The window comparators WCOM8 905 to 907 compare the image signals and the values of the registers 914 to 919 and output the results of the comparison to an AND gate 908. The results are then input to a flip flop 913 through gates 909 to 912 and synchronized with the clock signal VCLK1 to output a decision signal for one pixel. The clock signal VCLK1 is a clock signal with a period of one pixel which is formed from the signal VE and the signal VCLK by a circuit having the configuration shown in FIG. 9(B). FIG. 9(D) shows the timing of the clock signal. The output decision signal is controlled by a combination of the set values of the gates 909 to 912 and the set values of the registers 920 to 922 so that the decision signals shown in FIG. 10 are output from the circuit of the color decision section shown in FIG. 9(A). FIG. 10 is a table showing combinations of data RL, RH, GL, GH, BL and BH which are respectively set in the registers 914 to 919, the values respectively set in the registers KE0, KE1 and KEBASE, and the output decision signals.

In this embodiment, since the input image signal is output in the order of color components, as shown in FIG. 9(D), the flip flops 902 to 904 are provided for latching the image signal for each color component. Namely, the RGB data of the input image signal is compared with the data RL, RH, GL, GH, BL and BH of the registers 914, 915, 916, 917, 918 and 919, and a decision is made for determining the level of the decision signal as to whether or not the data R, G and B are between the data RL and RH, the data GL and GH, and the data BL and BH, respectively, or whether or not one of the data R, G and B is between the data RL and RH, the data GL and GH or the data BL and BH. A decision is made as to whether the value set in the register KEBASE 920 is controlled to be "1" or "0", so that a decision is made on the basis of the decision result whether or not the output decision signal is made the High level. In addition, the output decision signal is forced to be set to the High level or Low level by controlling the values set in the registers KE0 921 and KE1 922.

FIG. 9D shows the timing chart of each of the sections of the circuit of the color decision section 740.

The image composition characteristic of the present invention is described below. In this embodiment, the image composition includes two types of compositions, which are referred to as "white composition" and "black composition" hereinafter. In the white composition, a white portion of the image obtained by developing the PDL data sent to the image processing unit 109 from the host computer 103 is replaced by the original image (scanner image) placed on the original plate of the scanner printer 101. Similarly, in the black composition, a black portion is replaced by the scanner image. This state is shown in FIG. 12(1).

The composition mode is set by the operation section 604, and the no composition mode is automatically set immediately after the power source is turned on. In the state where the no composition mode is set, when the user pushes once the composition switch 809 of the operation section 604, the white composition mode is set. In the state where the white composition mode is set, when the user pushes the composition switch 809 once, the black composition mode is set. In the black composition mode, when the user pushes the composition switch 809, the black composition mode is returned to the no composition mode. These composition modes are displayed by the LEDS 801 and 802 shown in FIG. 8, as shown in FIG. 13.

The composition processing is performed by the scanner printer I/F section 702 of the image processing unit 109. The CPU 730 monitors the composition switch 809 of the operation section 604, controls the change of the composition modes and displays the composition mode on the LED 801 and 802. In each of the composition modes, the registers 914 to 922 of the color decision section 740 are set as shown in FIG. 14. The selector 744 shown in FIG. 7 is controlled by the CPU 730 so as to select the image signal output from the color decision section 740, i.e, the image signal output from the FIFO 739 shown in FIG. 7, when the output decision signal of the color decision section 740 is at the High level, and the selection 743 is controlled by the CPU 730 so as to select the output of the image processing 742 at the time of printing out. The CPU 730 also outputs the control signal for operating the scanner and the printer of the scanner printer 101 through the communication control section 735 when the white composition mode or the black composition mode is set, and controls the scanner printer 101 through the communication control section 736 so as to only actuate the printer of the scanner printer 101 when the no composition mode is set. When data for one band is completely developed on the DRAM 713, the CPU 710 of the PDL development section 701 informs the CPU 730 of the scanner printer I/F section 702 of the completion of development for one band through the serial communication sections 718 and 735. The CPU 710 checks through the serial communication sections 718 and 735 to determine whether or not the scanner printer I/F section 702 can receive the image data for one band. If the image data can be received, the image data for one band is successively transmitted to the scanner printer I/F 702 from the DRAM 713 through the video data I/F 719. In the white composition or black composition mode, when the PDL development section 701 informs the CPU 730 of the completion of development for one band, the CPU 730 starts the operation of the scanner of the scanner printer 101 through the communication control section 736. When the scanner of the scanner printer 101 then starts to scan data for one band, the CPU 730 informs the PDL development section 701 through the serial communication 735 that the image for one band can be received. The PDL developed image and the scanner original image are switched in pixel units by the selector 744 so that, for example, the white composition or black composition image shown in FIG. 12(1) and FIG. 12(2), respectively, are printed out. When the image for one band is completely printed out, the CPU 730 informs the PDL development section 710 through the serial communication 735 of the completion of printing for one band. When the PDL development section 701 receives the information through the serial communication 718 that the image for one band is completed, development of the PDL image for the next one band is started. This operation is repeated to the end of one page. The aforementioned control permits the composition processing, and the same operation of the PDL development section 701 in all composition modes.

Second Embodiment

An image processing system in accordance with a second embodiment of the present invention is described below. In the second embodiment, substantially the same portions as those in the first embodiment are denoted by the same reference numerals, and are not described below.

The configuration of the second embodiment is the same as that of the first embodiment with the exception that when there is a pure white region in a lower portion of the output resultant page during printing out, the paper is immediately discharged without scanning of the printing head in the second embodiment. In the first embodiment, the printing head is scanned regardless of the pure white portion.

FIG. 15 shows a flowchart for processing of the CPU 710 in the second embodiment. This is different from the first embodiment in that Steps S2, S3, S4, S6 and S7 are present.

The PDL data from the host computer 103 is received and stored in the DRAM 713 in Step S1. The CPU 710 then communicates with the scanner printer I/F section 702 and checks whether or not the composition mode is the white composition mode in Step S2. If the mode is the white composition mode, "1" is substituted in the WC flag in Step S4, and if the mode is not the white composition mode, "0" is substituted in the WC flag in Step S3. A decision is made in Step S5 whether or not the entire one page is completely output. If output is completed, the paper is discharged in Step S10, and if output is not completed, the flow moves to Step S6 in which the WC flag is checked. If the WC flag is "1", the flow moves to Step S8, and if the WC flag is not "1", the flow moves to Step S7. A decision is made in Step S7 as to whether or not all portions of the PDL image data after a band to be printed out is pure white. If all portions are white, the paper is discharged in Step S10, and if all portions are not white, the flow returns to Step S8. In Step S8, the PDL data is translated, and the image for one band to be printed out is developed. The developed image data is then transmitted to the scanner printer I/F section 702 in Step S9, and the flow returns to Step S5. The scanner printer I/F section 702 sends the image data sent from the PDL development section 701 to the scanner printer 101 and prints the data thereby.

In the second embodiment, the above processing prevents scanning of the printing head when the latter half of the page to be printed is pure white, thereby decreasing the time of printing out. In the white composition mode, since the original image of the scanner printer 101 must be incorporated into a white region of the PDL image, the scanning of the printing head is repeated to the end of one page. In the black composition mode, a black portion of the PDL is simply replaced by the original image, and a white portion thereof remains white in the final resultant image, thereby cancelling useless scanning of the printing head.

Another possible method for further decreasing the printing time is to cancel scanning of the printing head not only in a lower portion of a page but also in an upper portion and intermediate bands so as to carry the paper.

The present invention may be applied to a system comprising a plurality of devices, and an apparatus comprising a single device.

The present invention can of course be applied to the case where the invention is achieved by supplying a program to a system or an apparatus.

Although each of the embodiments of the present invention uses as an optical-electrical conversion device an original reading device, a device such as a still video, a video camera or the like may be used. In this case, a still video or a video camera may repeatedly be operated in accordance with the operation of the PDL development section 701 serving as development means.

As described above, in an image forming system having a scanner and the function to print out, for example, a PDL developed image in accordance with the embodiments of the present invention, the image read by the scanner is fitted into, for example, the white or black region of the PDL developed image, by the simple operation of pushing one switch of the operation section. The method in accordance with the embodiments of the present invention has the advantages that it takes less time to transfer the scanner original image to the host computer and to process the image by the host computer using an image edit application software, and that the host computer need not have a large-capacity memory space for raster image data of the scanner original image, as compared with a method in which the scanner original image is stored in the host computer, and the same composite image is formed by an image edit application software of the host computer and then is simultaneously printed out.

What is claimed is:

1. An image processing apparatus comprising:

development means for developing a portion of one page into raster image data by translating a page describing language;

storage means for storing partial image data of one page developed by said development means;

original reading means for reading in the units into which an original is divided;

composition means for forming composite image data on the basis of the image data read from said storage means and the original image data read by said original reading means;

control means for controlling said development means, said original reading means and said composition means so as to develop an image for one page in units, operate said original reading means and said composition means synchronously with image development in units to form an image, and repeating image development in units to form an image for one page, and setting means for setting contents of composition processing for composing an image so that said composition means switches the image data read from said storage means and the original image data read by said original reading means in accordance with the contents set by said setting means.

2. An image processing apparatus according to claim 1, wherein said setting means is manually operated.

3. An image processing apparatus according to claim 1, wherein said setting means has the processing and setting function to output as the composition processing contents the image data read from said storage means as it was, and said control means controls so that said original reading means is not operated when the contents are set by said setting means so that the image data from said storage means is output as it was.

4. An image processing apparatus comprising:

development means for developing a portion of one page into raster image data by translating a page describing language;

storage means for storing partial image data of one page developed by said development means;

original reading means for reading in the units into which an original is divided;

composition means for forming composite image data on the basis of the image data read from said storage means and the original image data read by said original reading means; and control means for controlling said development means, said original reading means and said composition means so as to develop an image for one page in units, operate said original reading means and said composition means synchronously with image development in units to form an image, and repeating image development in units to form an image for one page, wherein said composition means outputs the image data output from said original reading means in place of the image data stored in said storage means in accordance with the specified value of the image data stored in said storage means.

5. An image processing apparatus according to claim 4, wherein said specified value is data indicating "white".

6. An image processing apparatus according to claim 4, wherein said specified value is data indicating "black".

7. An image processing apparatus comprising:

development means for developing a portion of one page into raster image data by translating a page describing language;

storage means for storing partial image data of one page developed by said development means;

original reading means for reading in the units into which an original is divided;

composition means for forming composite image data on the basis of the image data read from said storage means and the original image data read by said original reading means; and control means for controlling said development means, said original reading means and said composition means so as to develop an image for one page in units, operate said original reading means and said composition means synchronously with image development in units to form an image, and repeating image development in units to form an image for one page, wherein said development means has the function to decide by translating the page describing language whether or not all of the pixels in a portion of one page are white, and said control means controls said image forming means so as to convey paper in correspondence to formation of an image in the units without forming an image in the units when all of the pixels for the unit of one page are white on the basis of the result of decision made by said development means as to whether or not all of the pixels of the unit of one page are white when said setting means performs processing and setting to output the image data from said storage means as is.

8. An image processing method comprising:

a development step of developing a portion of one page into raster image data by translating a page describing language;

a storage step of storing in a storage means partial image data of one page developed by said development step;

an original reading step of reading in units into which an original is divided;

a composition step of forming composite image data on the basis of image data read from said storage means and the original image data read by said original reading step;

a control step of controlling said development step, said original reading step and said composition step so as to develop an image for one page in units, operate said original reading step and said composition step synchronously with image development in units to form an image, and repeating image development in units to form an image, and repeating image development in units to form an image for one page, and a setting step of setting contents of composition processing for composing an image so that said composition step switches the image data read from said storage means and the original image data read by said original reading step in accordance with the contents set by said setting step.

9. An image processing method according to claim 8, wherein said setting step is manually performed.

10. An image processing method according to claim 8, wherein said setting step has the processing and setting function to output as the composition processing contents the image data read from said storage means as is, and said control step controls so that said original reading step is not performed when the contents are set by said setting step so that the image data from said storage means is output as is.

11. An image processing method comprising:

a development step of developing a portion of one page into raster image data by translating a page describing language;

a storage step of storing in a storage means partial image data of one page developed by said development step;

an original reading step of reading in units into which an original is divided;

a composition step of forming composite image data on the basis of image data read from said storage means and the original image data read by said original reading step; and a control step of controlling said development step, said original reading step and said composition step so as to develop an image for one page in units, operate said original reading step and said composition step synchronously with image development in units to form an image, and repeating image development in units to form an image for one page, wherein said composition step outputs the image data output from said original reading means in place of image data stored in said storage means in accordance with the specified value of the image data stored in said storage means.

12. An image processing method according to claim 11, wherein said specified value is data indicating "white".

13. An image processing method according to claim 11, wherein said specified value is data indicating "black".

14. An image processing method comprising:

a development step of developing a portion of one page into raster image data by translating a page describing language;

a storage step of storing in a storage means partial image data of one page developed by said development step;

an original reading step of reading in units into which an original is divided;

a composition step of forming composite image data on the basis of the image data read from said storage means and the original image data read by said original reading step; and a control step of controlling said development step, said original reading step and said composition step so as to develop an image for one page in units, operate said original reading step and said composition step synchronously with image development in units to form an image, and repeating image development in units to form an image, and repeating image development in units to form an image for one page, wherein said development step has the function to decide by translating the page describing language whether or not all of the pixels in a portion of one page are white, and said control step controls said image forming step so as to convey paper in correspondence to formation of an image in the units without forming an image in the units when all of the pixels for the unit of one page are white on the basis of the result of decision made by said development step as to whether or not all of the pixels of the unit of one page are white when said setting step performs processing and setting to output the image data from said storage means as is.

15. An image processing method comprising:

a development step of developing a portion of one page into raster image data by translating a page describing language;

a storage step of storing in a storage means at least partial image data of one page developed by said development step;

an obtaining step of obtaining another image data in units into which another image is divided;

a composition step of forming composite image data on the basis of image data read from said storage means and said another image data obtained by said obtaining step; and a control step of controlling said development step, said obtaining step and said composition step so as to develop an image for one page in units, operate said development step, said obtaining step and said composition step synchronously in units to form an image, and repeating image development in units to form an image for one page, wherein said composition step outputs the image data obtained by said obtaining step in place of image data stored in said storage means in accordance with the specified value of the image data stored in said storage means.

16. An image processing method according to claim 15, wherein said specified value is data indicating "white".

17. An image processing method according to claim 15, wherein said specified value is data indicating "black".

* * * * *

UNITED STATES PATENT AND TRADEMARK OFFICE
CERTIFICATE OF CORRECTION

PATENT NO. : 6,064,777
DATED : May 16, 2000
INVENTOR(S) : Akira Negishi, et al.

Page 1 of 2

It is certified that error appears in the above-identified patent and that said Letters Patent is hereby corrected as shown below:

COLUMN 1:

Line 59, "transfer" should read --the transfer-- and "the" should read --an additional--.

COLUMN 2:

Line 16, "TFE" should read --THE--.

COLUMN 4:

Line 4, "shake" should read --sake--.

COLUMN 6:

Line 2, "the" (first occurrence) should be deleted;
Line 43, "LED" should read --LEDs--; and
Line 48, "LED" should read --LEDs--.

COLUMN 7:

Line 53, "a" should read --an--.

UNITED STATES PATENT AND TRADEMARK OFFICE
CERTIFICATE OF CORRECTION

PATENT NO.    : 6,064,777
DATED         : May 16, 2000
INVENTOR(S)   : Akira Negishi, et al.

It is certified that error appears in the above-identified patent and that said Letters Patent is hereby corrected as shown below:

COLUMN 11:

Line 52, "is" should read --are--.

Signed and Sealed this

Seventeenth Day of April, 2001

Attest:

NICHOLAS P. GODICI

Attesting Officer    Acting Director of the United States Patent and Trademark Office